UNITED STATES PATENT OFFICE.

JOSEPH B. HARRIS, OF GERMANTOWN, KENTUCKY.

IMPROVED COMPOSITION OF MATTER FOR RENDERING PAINT FIRE-PROOF.

Specification forming part of Letters Patent No. 56,044, dated July 3, 1866.

*To all whom it may concern:*

Be it known that I, JOSEPH B. HARRIS, of Germantown, in the county of Mason and State of Kentucky, have invented a new and useful Composition of Matter for Rendering Oil-Paints Uninflammable or Fire-Proof; and I do hereby declare that the following is a full and exact description thereof.

The nature of my invention consists in combining with any of the oil-paints in common use calcined schist, shale, or mineral coal reduced to a chalky and pulverous condition by heat and freed from all hard or gritty particles.

To enable others skilled in the art to which it pertains to make and use my invention, I will proceed to describe more particularly the mode of carrying it into effect.

I take the schist or shale that is found in connection with bituminous coal, having but little bitumen in it, and subject it to heat in a retort or kiln till all the bituminous and volatile substances have been expelled and the residuum has been reduced to a friable and pulverous condition of a light-gray or pearl color. This pulverous residuum is then bolted through a fine bolt to free it of all hard lumps and gritty particles, and then ground in good boiled linseed-oil with the paint with which it is to be combined. The quantity requisite to make the paint uninflammable will depend in some degree upon the body or qualities of the paints with which it is combined. For white and red lead I use about the following proportions: three parts, in weight, of the calcined schist, shale, or coal to one part of lead ground together in good oil, as above described, and for ochers, umbers, &c., four parts of the calcined material to one part of ocher or umber prepared and ground as aforesaid. For other paints the proportions should be about the same as last mentioned. No turpentine is used as a drier; but japan or litharge or driers of a thin nature should be used.

The ingredient which I thus add to all paints to render them uninflammable or fire-proof is, as has been before stated, of a light-gray or pearl color, and may be added to any paint without materially changing its hue; but a finishing coat may be added without any of this ingredient in it to give any shade or brilliancy that may be desired. Wood painted with this mixture will resist the action of flame, sparks, and live coals, so that floors painted with it will not be liable to take fire from the falling of burning coals upon them, and roofs of buildings will be protected from danger by sparks flying from the chimney or burning shingles and other light burning substances carried by the wind from burning buildings in the vicinity.

The chalky calcined residuum which I use may be produced from most kinds of mineral coal; but I regard the slightly-bituminous schists or shales found in coal-mines preferable to mineral coal proper.

Having thus fully described my invention and the mode of carrying it into effect, what I claim as new, and desire to secure by Letters Patent, is—

The combination of calcined schist, shale, or mineral coal, prepared as above described, with any kind of oil-paint, to render the same uninflammable or fire-proof, substantially as above set forth.

J. B. HARRIS.

Witnesses:
J. J. COOMBS,
A. H. POLLOCK.